United States Patent [19]

Livingston

[11] Patent Number: 4,664,403
[45] Date of Patent: May 12, 1987

[54] HITCH ADAPTER FOR DOUBLE CASTER WHEEL TRAILER

[76] Inventor: C. Glenn Livingston, 114 St. Andrews Ct., Columbia, S.C. 29210

[21] Appl. No.: 789,215

[22] Filed: Oct. 18, 1985

[51] Int. Cl.⁴ .............................................. B60D 1/06
[52] U.S. Cl. .................................. 280/460 R; 280/492; 280/494; 280/DIG. 14
[58] Field of Search ........... 280/460 R, 460 A, 456 R, 280/456 A, DIG. 14, 204, 492, 494, 789, 292, 446 R, 446 B

[56] References Cited

U.S. PATENT DOCUMENTS

| | | | |
|---|---|---|---|
| 1,234,788 | 7/1917 | Milner | 280/460 R X |
| 2,120,422 | 6/1938 | Williams et al. | 280/492 |
| 2,435,383 | 2/1948 | Chaffin | 280/492 |
| 2,475,174 | 7/1949 | Boone | 280/156 R |
| 2,712,945 | 7/1955 | Peterson | 280/DIG. 14 |
| 3,033,593 | 5/1962 | Zaha | 280/460 R |
| 3,379,452 | 4/1968 | Torrisi | 280/414.1 X |
| 4,076,264 | 2/1978 | Chatterley | 280/460 R X |
| 4,305,602 | 12/1981 | Ungvari et al. | 280/460 R |
| 4,426,097 | 1/1984 | Livingston | 280/415 A |
| 4,452,465 | 6/1984 | Bourke | 280/460 R X |
| 4,512,593 | 4/1985 | Ehrhardt | 280/460 R |

Primary Examiner—John J. Love
Assistant Examiner—Mitchell J. Hill
Attorney, Agent, or Firm—Flynn, Thiel, Boutell & Tanis

[57] ABSTRACT

A trailer hitch structure for coupling a double caster-type wheel trailer to a tow vehicle having a conventional hitch bar fixed thereto and projecting rearwardly thereof. There is provided a rigid vehicle connector having a front portion fixedly connectable to the hitch bar. The front portion connects to a transversely extending rear portion which extends generally parallel to the vehicle bumper. This rear portion mounts adjustable bumper elements adjacent the opposite ends thereof, which bumper elements adjust for snug engagement with the vehicle bumper. A crossbar is positioned adjacent but slightly rearwardly from the rear portion and is coupled thereto through a swivel structure which defines a horizontal roll axis which extends in the longitudinal direction of the vehicle. The crossbar mounts a pair of hitch balls adjacent the opposite ends thereof. The trailer has a tongue structure provided with a pair of sidewardly spaced couplers for releasable engagement with the hitch balls.

11 Claims, 5 Drawing Figures

4,664,403

HITCH ADAPTER FOR DOUBLE CASTER WHEEL TRAILER

FIELD OF THE INVENTION

This invention relates to an improved trailer hitch arrangement for attachment to a vehicle to facilitate the attaching and towing of a double caster wheel trailer.

BACKGROUND OF THE INVENTION

My U.S. Pat. No. 4,426,097 discloses a small trailer adapted for attachment to a vehicle, the trailer utilizing a single caster-type wheel for support. This one-wheel trailer, and its stable and secure attachment to the vehicle, necessarily requires a special trailer hitch arrangement which, in the aforesaid patent, involves a T-shaped support having a longitudinally extending leg which attaches to a conventional vehicle drawbar, with a transversely extending leg having a pair of hitch balls adjacent the opposite ends thereof for attachment to dual couplers associated with the tow bar of the trailer.

While the single-wheel trailer and hitch arrangement of the aforesaid patent does operate in a desirable manner, and does provide desirable advantages particularly when backing a vehicle since the trailer tracks with the vehicle, nevertheless the American public has an inherent distrust of single-wheel trailers, apparently due to the public's inability to accept that such single-wheel trailers can be safely utilized. The only problem with such single-wheel trailers, however, is their limited load capacity, which capacity is limited by the suspension associated with the single caster-type wheel.

The public's lack of faith in single-wheel trailers is evidenced by the extensive use of two-wheel trailers. While most two-wheel trailers involve a conventional pivot-type hitch such that the trailer does not identically track with the vehicle, particularly when backing up, nevertheless there have been attempts to provide a two-wheel trailer which will track with the vehicle similar to a single-wheel trailer. For example, U.S. Pat. Nos. 2,475,174 (Boone), 3,033,593 (Zaha), 3,379,452 (Torrisi), 4,452,465 (Bourke), 4,305,602 (Ungvari), 4,512,593 (Ehrhardt) and 4,076,264 (Chatterley) all disclose two-wheel trailers employing some special arrangement, such as casters, a control linkage between the two caster wheels, and/or a dual or specialized hitch arrangement for effecting a rigid securement of the trailer to the towing vehicle. These latter patents have hence attempted to provide a structure so as to increase the control, and thus the tracking, of the trailer relative to the towing vehicle. These attempts, however, as evidenced by the complexities of the structures disclosed in these patents, and the fact that these structures still have undesirable characteristics, readily indicate the difficulty in providing a two-wheel trailer together with a hitch attachment therefore which will properly track with the vehicle movement, particularly when backing up.

More specifically, the aforementioned Boone U.S. Pat. No. 2,475,174 discloses a trailer having a pair of caster-type wheels, with the trailer having a single central hitch for attachment to the towing vehicle. The trailer also has a pair of separate auxiliary connectors disposed on opposite sides of the hitch adjacent the ends of the vehicle bumper, which auxiliary connectors control a flexible cable linkage, which in turn controls the swivelling of the casters. This patent hence discloses a three-point hitch arrangement, and does not permit free swivelling of the casters, but rather provides a complex arrangement for controlling swivelling of the casters.

The Zaha U.S. Pat. No. 3,033,593, as mentioned above, discloses a trailer having a pair of caster-type wheels, a central hitch of conventional configuration, and a pair of sidewardly spaced tie bars so as to create a three-point connection. This hence rigidifies the trailer relative to the vehicle, but the side tie bars must be released when swivelling of the wheels and backing of the trailer is desired. Further, this three-point connection does not permit proper rolling movement of the trailer relative to the vehicle, such as may be necessary to compensate for irregularities in the highway.

The aforementioned Ungvari U.S. Pat. No. 4,305,602 discloses a trailer having caster-type wheels, with the trailer having a dual hitch arrangement so as to rigidify the trailer relative to the vehicle. This double hitch arrangement, however, has several disadvantages. For example, the tow vehicle must be provided with a specialized tow bar which mounts hitch balls thereon. Further, the overall hitch arrangement does not permit or compensate for rolling movement of the trailer relative to the vehicle due to unevenness in the highway. This hitch arrangement also does not permit even weight distribution on the trailer or vehicle wheels.

The Ehrhardt U.S. Pat. No. 4,512,593, mentioned above, discloses two caster wheels joined together by drive sprockets and chains so that the caster wheels are constrained for simultaneous movement. The trailer also has two rigid tow bars which couple to sidewardly spaced hitch balls mounted on the tow vehicle. This arrangement possesses the same disadvantages mentioned above, and like Ungvari, does not permit relative roll between the vehicle and trailer.

Accordingly, it is an object of this invention to provide an improved hitch arrangement specifically for cooperation between a towing vehicle and a trailer of the type employing two caster wheels, which hitch arrangement provides improved tracking of the trailer and improved stability and load distribution on both the trailer and vehicle, while at the same time overcoming the disadvantages associated with prior hitch arrangements which have been associated with trailers employing caster wheels.

More specifically, the improved hitch arrangement, in combination with the two caster wheel trailer, provides a substantially rigid longitudinal connection between the vehicle and trailer so as to permit the trailer to be readily backed up while tracking with the vehicle, and at the same time the hitch arrangement provides not only relative hinging between the trailer and vehicle in a horizontal transverse direction so as to compensate for changes in road pitch or elevation, but it also permits roll of the trailer relative to the vehicle substantially about a longitudinally extending axis so as to compensate for uneven or nonlevel road conditions or uneven loading.

The improved hitch arrangement employs a main T-shaped connector which has a leg thereof rigidly attached to the conventional tow bar as associated with the vehicle, whereby the head of the connector extends transversely in substantially parallel relationship to the rear vehicle bumper. The head of the T-shaped connector swivelly supports thereon a roll pin which has the axis thereof extending substantially in the longitudinal direction of the trailer-vehicle combination. The roll pin projects rearwardly and is fixed to a trailer connector bar, the latter extending generally parallel to but spaced slightly rearwardly from the head of the T-shaped connector and also being swivably movable about the roll axis. This connector bar has a pair of conventional hitch balls mounted adjacent the opposite ends thereof for engagement with a pair of conventional ball-receiving couplers mounted on a pair of projecting tongues associated with the trailer. These tongues are fixed to and comprise part of the frame of the trailer, and have the connectors at the forward ends thereof spaced apart by a relatively small transverse distance, such as in a range of about 9 to 20 inches. The tow bars, as they project rearwardly from the couplers, diverge outwardly with respect to one another so that the longitudinal axes of the tow bars effectively intersect the vertical swivel axes of the caster wheels, whereby this facilitates the transmission of force from the ground through the wheels and trailer frame to the hitch arrangement.

Other objects and purposes of the invention will be apparent to persons familiar with arrangements of this general type upon reading the following specification and inspecting the accompanying drawings.

Figure 1:
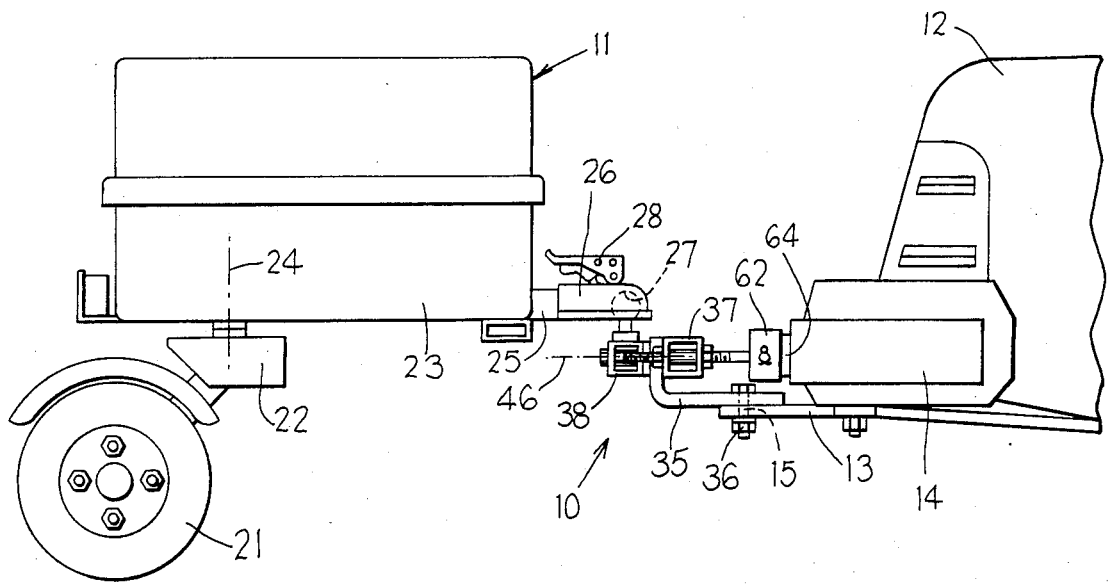
FIG. 1 is a side elevational view which illustrates the attachment of a two caster wheel trailer to a vehicle by means of a hitch arrangement according to the present invention.

Certain terminology will be used in the following description for convenience in reference only, and will not be limiting. For example, the words "upwardly", "downwardly", "rightwardly" and "leftwardly" will refer to directions in the drawings to which reference is made. The word "front" or "forward" will refer to the rightward end of the hitch arrangement in FIGS. 1–5. The words "inwardly" and "outwardly" will refer to directions toward and away from, respectively, the geometric center of the device and designated parts thereof. Said terminology will include the words specifically mentioned, derivatives thereof, and words of similar import.

DETAILED DESCRIPTION

Figure 2:
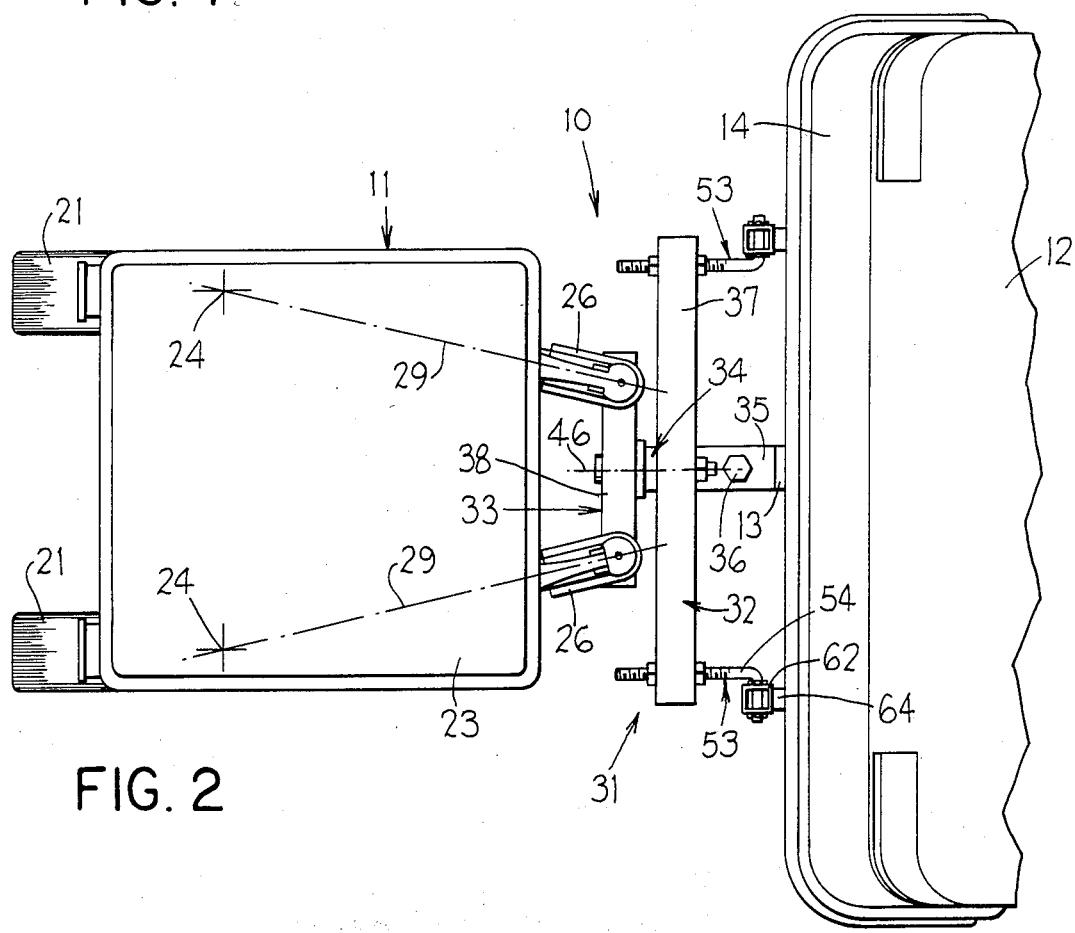
FIG. 2 is a top view illustrating the hitch arrangement coupled between the trailer and vehicle.

FIGS. 1 and 2 illustrate therein a hitch arrangement 10 for coupling a two caster wheel trailer 11 to the rear of the vehicle 12, such as an automobile.

As illustrated in FIGS. 1 and 2, the vehicle 12 has a standard trailer hitch, such as a class I hitch, mounted thereon. This standard hitch includes a hitch bar 13 which is appropriately fitted to the vehicle, such as by being fixed to the frame or to the bumper in a conventional manner. This hitch bar 13, which is positioned below the rear vehicle bumper 14 and projects rearwardly thereof, has a conventional opening 15 extending therethrough. A standard hitch ball (not shown) is conventionally removably mounted on the hitch bar 13 due to the threaded extension on the ball extending through the opening 15, which threaded extension receives thereon a standard lock washer and nut. This standard hitch, as defined by the bar 13 and the ball (not shown), is well known and extensively utilized on automotive vehicles, so that further description of same is believed unnecessary.

Considering now the trailer 11 as illustrated by FIGS. 1 and 2, same includes a pair of sidewardly spaced wheels 21 disposed for rolling engagement with the roadway or ground. The wheels 21 are normally positioned wholly below the bed or frame 23 of the trailer, and each wheel is supported on the frame 23 by a caster-type support 22 which defines a vertical swivel axis 24 about which the caster support 22 and wheel 21 can swivel. This swivel axis 24 is disposed substantially forwardly of the horizontal rotational axis of the wheel 21 when in the standard towing position illustrated by FIG. 1.

The frame 23 of the trailer includes a pair of elongated tongues or drawbars 25 which project outwardly from the forward end of the trailer, each of these tongues or drawbars 25 having a standard coupler 26 associated with the free end thereof. This coupler defines therein a downwardly opening recess 27 for accommodating therein a standard hitch ball, and also has a manually movable lock lever 28 for activating the coupler to secure the trailer tongue to the hitch ball. This coupler 26 is a standard and well known structure.

The two tongues or drawbars 25, at their forward free ends, are disposed in sidewardly spaced but relatively close proximity to one another so that the pair of couplers 26 are hence disposed in spaced but fairly close relationship. For example, the couplers 26 are normally sidewardly spaced apart by a distance of about 10 to 14 inches, although this spacing between the couplers could be in the range from about 9 inches to about 20 inches without seriously effecting the desired performance of the trailer and hitch arrangement. The pair of drawbars 25, as they project rearwardly from the couplers 26, define elongated directions 29 whereby the pair of drawbars diverge with respect to one another as they project rearwardly, such that the elongated direction (i.e. the centerline) of each drawbar 25 hence effectively intersects a respective one of the swivel axes 24 as illustrated in FIG. 2. This hence provides optimum force transfer from the ground through the wheels, thence through the caster assemblies to the drawbars, and thence to and through the hitch arrangement.

To couple the two-wheel trailer 11 to the rear of the vehicle 12, the hitch arrangement 10 incorporates therein a hitch adapter 31 of this invention. This hitch adapter 31 (FIG. 3) includes a vehicle connector 32 which is generally T-shaped when viewed from above. This T-shaped vehicle connector 32 mounts thereon a trailer connector 33 through an intermediate swivel structure 34 which is provided to permit roll between the trailer and vehicle.

The T-shaped vehicle connector 32 includes a substantially L-shaped connector bar or base leg 35 having a front horizontal leg 35A which projects forwardly in overlapping relationship to the hitch bar 13. The leg 35A has an opening therethrough which aligns with the opening 15 in the hitch bar, and a suitable fastener 36, such as a bolt, extends through the aligned openings for fixedly connecting the connector bar 35 to the hitch bar 13. This connector bar 35 has a rear vertically projecting leg 35B which projects upwardly and is fixedly secured, as by welding, to the midpoint of the rear side of a transversely elongated bar or support 37. This support 37 is formed substantially as an elongated hollow tube of substantially square or rectangular cross section. Support 37 is spaced upwardly from the elevation of the hitch bar 13 and thus extends substantially at the elevation of and substantially parallel to the rear bumper 14 but is spaced rearwardly a small distance therefrom.

The trailer connector 33 also includes a transversely elongated support or crossbar 38, the latter being disposed closely adjacent but spaced rearwardly a small distance from the transverse support 37. This crossbar 38 is also preferably formed from a hollow tube of square or rectangular cross section, and can be positioned so as to extend generally parallel with the transverse support 37 when the trailer and vehicle are aligned and supported in level relationship with one another. This crossbar 38, adjacent the opposite free ends thereof, mounts thereon a pair of hitch balls 39. These hitch balls 39 are conventional in that each has a downwardly projecting threaded stud 41 which extends through an appropriate opening formed in the crossbar, so that the hitch ball is hence removably fixed to the crossbar by securement of an appropriate nut 42 on the threaded stud below the crossbar. The pair of hitch balls 39 are sidewardly spaced apart by a small distance, which distance corresponds to the spacing between the couplers 26, as explained above.

The crossbar 38 has a platelike spacer 43 fixed to the front side thereof, as by welding. This spacer is provided substantially at the midpoint of the crossbar, and is disposed so as to be sandwiched between crossbar 38 and transverse support 37 and hence maintain a proper front-to-back spacing therebetween so as to enable proper swivelling of the crossbar 38, as explained hereinafter.

Figure 3:
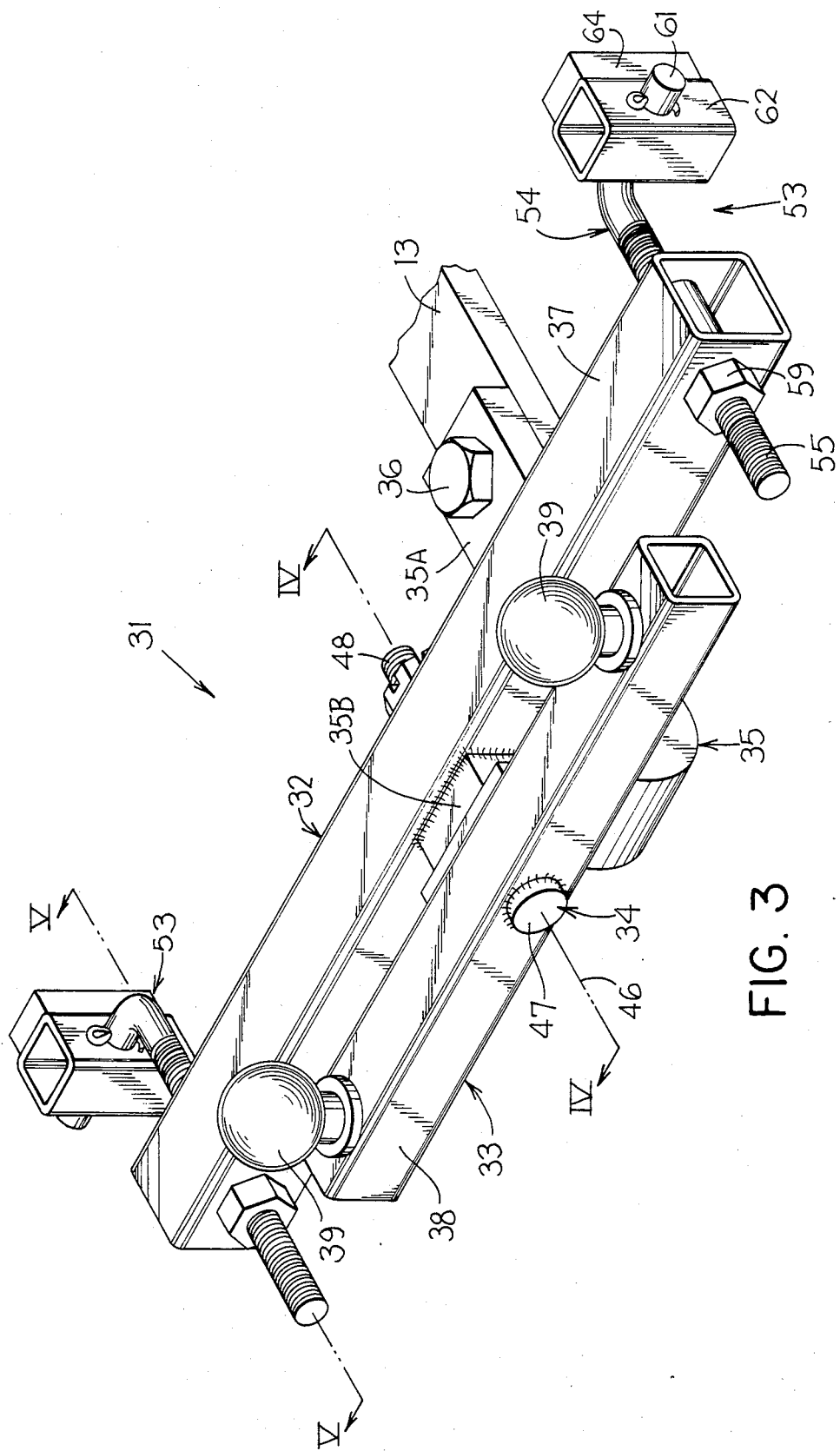
FIG. 3 is a perspective view illustrating the hitch arrangement and its attachment to the standard trailer hitch bar as mounted on a vehicle.
Figure 4:
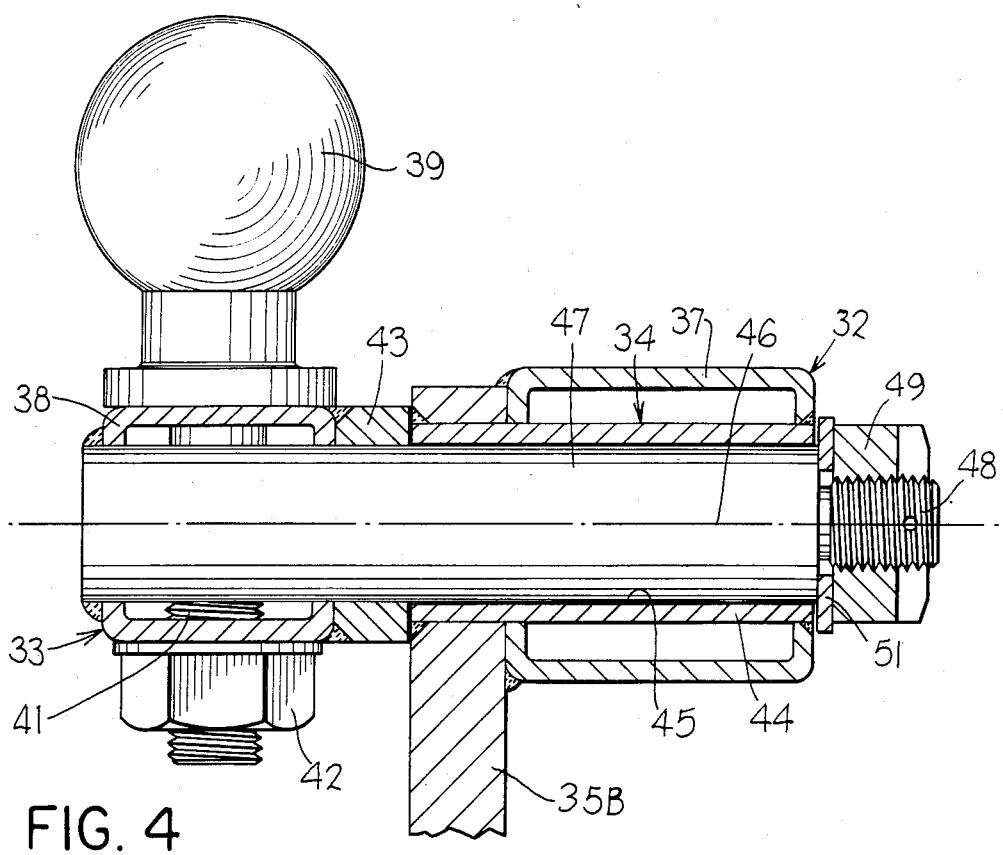
FIG. 4 is an enlarged fragmentary sectional view as taken substantially along line IV—IV of FIG. 3.

The transverse support 37 and crossbar 38 are appropriately swivelly joined together by the swivel structure 34. This structure, as illustrated by FIGS. 3 and 4, includes a support sleeve 44 which is fixed to the leg 35B and the transverse support 37, as by welding, and extends therethrough so as to define a substantially cylindrical bearing opening 45. This latter opening 45 extends substantially horizontally in the longitudinal direction of the vehicle-trailer combination (i.e. in the direction of travel), and hence the axis 46 of this opening 45 thus effectively defines a horizontal roll axis for permitting relative rolling movement of the vehicle and trailer with respect to one another.

The swivel structure 34 also includes a roll shaft 47 which is fixed to the crossbar 38, such as by penetrating through the crossbar and being welded thereto. This roll shaft 47 projects horizontally forwardly from the crossbar, including projecting through and outwardly beyond the spacer 43, whereby the forwardly projecting portion of this roll shaft 47 hence is snugly but rotatably accommodated within the cylindrical opening 45. The roll shaft 47 has a reduced-diameter threaded stub shaft 48 formed on the forward free end thereof, which stub shaft 48 projects outwardly beyond the front face of the transverse support 37. A suitable nut 49 and washer 51 are mounted on the threaded stub shaft 48 to axially secure the roll shaft 46 to the T-shaped vehicle connector 32.

Figure 5:
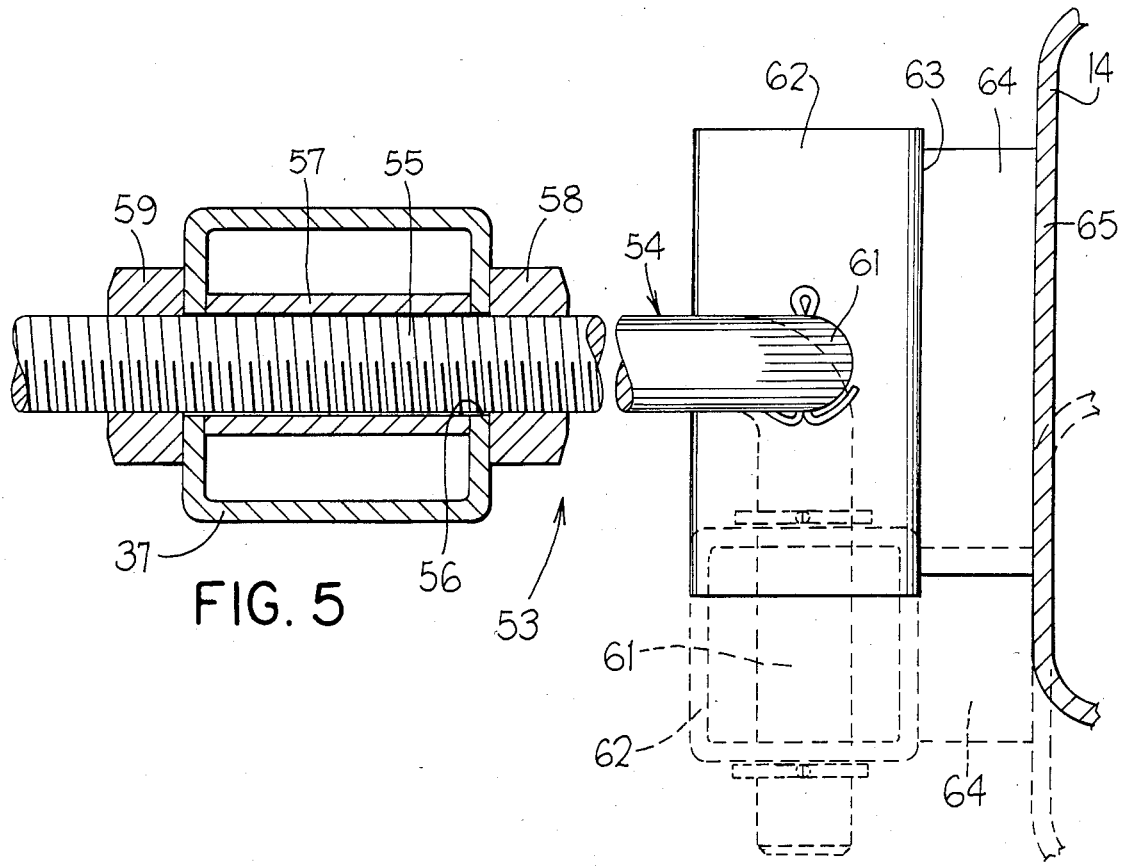
FIG. 5 is an enlarged fragmentary sectional view as taken substantially along line V—V in FIG. 3.

The hitch adapter 31 also mounts thereon a pair of adjustable bumper structures 53, the latter being disposed adjacent the opposite ends of the transverse support 37 for supportive engagement with the rear vehicle bumper 14. This adjustable bumper structure 53, as illustrated by FIGS. 3 and 5, includes a substantially L-shaped support arm 54 having a rearwardly extending leg 55 which projects through openings 56 formed in the transverse support 37. This rear horizontal leg 55 is also suitably supported within an intermediate spacer sleeve 57 which is disposed in surrounding relationship thereto within the transverse support 37. This rear leg 55 is threaded and is disposed in threaded engagement with nuts 58 and 59 disposed on opposite sides of the support 37 for permitting the position of the arm 54 to be adjusted toward or away from the vehicle, and then suitably securely locked in the desired position.

The arm 54 has a transversely or sidewardly projecting front leg 61 which mounts thereon a bumper support 62, the latter being illustrated as a short segment of a hollow tubular element of substantially square configuration. This bumper support defines thereon a front face 63, and an appropriate elastomeric bumper element 64 is suitably secured thereto, as by an adhesive. This elastomeric bumper element 64 projects forwardly and has a front face 65 thereon which is adapted to be moved into compressive supportive engagement with the rear vehicle bumper 14.

OPERATION

When it is desired to haul the double caster wheel trailer 11, and assuming that the vehicle 12 has a conventional hitch bar 13 thereon, then the hitch ball (not shown) which is conventionally mounted on the hitch bar is initially removed. Thereafter the hitch adapter 31 is oriented so that the front leg 35A of the connector bar is positioned directly over the hitch bar 13 so that the openings therein are aligned. When so positioned, the fastener or bolt 36 is then extended through the aligned openings so as to fixedly and rigidly secure the T-shaped vehicle connector 32 to the hitch bar 13.

With the adapter 31 coupled to the hitch bar 13 as described above, this hence effectively causes the adapter 31 to project rearwardly beyond the vehicle bumper 14 so that the transverse support 37 and the cross bar 38 are disposed rearwardly from the vehicle bumper. At the same time, the support 37 and cross bar 38 are positioned at an elevation substantially above the hitch bar 13, and hence are positioned at an elevation similar to that of the rear bumper 14, whereupon the trailer 12 can be suitably coupled to the hitch adapter by means of the two couplers 26 being engaged in a conventional manner with the two hitch balls 39.

During the coupling of the trailer couplers 26 to the hitch balls 39, the coupling is greatly facilitated by the fact that the crossbar 38 can be angularly tilted about the roll axis 46 so as to assume a nonparallel relationship with respect to the transverse support 37, if necessary. For example, if the trailer and vehicle are sitting on nonlevel ground so that one is tilted relative to the other, or if the trailer is sitting in a nonlevel manner due to uneven loading thereof, then the two couplers 26 may be in a vertically skewed relationship relative to the transverse support 37. This can be readily compensated for solely by angularly swivelling the crossbar 38 about the roll axis 46 so that the hinge balls 39 will hence elevationally align with the couplers 26 to facilitate attachment of the trailer to the hitch adapter.

This same swivelling of the crossbar 38 about the roll axis 46 is also desirable when disconnection of the trailer from the vehicle is desired. Absent this swivelling or rolling capability, the trailer and vehicle may be sitting on uneven ground which would cause a distortion of the trailer frame such that, when attempting to uncouple the trailer, the trailer could spring or jump apart with substantial force, and hence could cause potential injury to the operator. The permissible rolling or swivelling of the crossbar 38 of this invention, however, will substantially automatically compensate for such uneven terrain or loading, and hence will significantly increase the safety of the operator when uncoupling the trailer.

Further, when pulling the trailer, highway conditions or uneven loading tend to cause relative sideward roll or displacement of the trailer with respect to the vehicle. While this creates highly undesirable loading condition on the vehicle and/or trailer wheels in a conventional two-wheel trailer, nevertheless this is readily compensated for in the present invention inasmuch as the trailer can readily sidewardly roll with respect to the vehicle about the roll axis 46. This hence permits both the vehicle and trailer wheels to remain in uniform contact with the roadway even though relatively nonlevel conditions are encountered. Further, when the vehicle is towing the trailer, the swivel structure 34 provides for desirable transmission of the towing force inasmuch as the rearwardly directed force imposed on the vehicle by the trailer is transmitted from the crossbar 38 into the roll pin 47. The force in the roll pin 47 is substantially a tension force which is rearwardly directed, and it in turn is transmitted from the nut 49 and washer 51 onto the front face of the transverse support 37, which in turn transmits this force through the connector bar 35 to the conventional vehicle hitch bar 13.

Since the couplers 26 themselves are secured to the front free ends of the drawbars, which drawbars angle outwardly as they project rearwardly so as to effectively intersect the swivel axes of the caster wheels, this hence greatly facilitates the force transfer from the vehicle through the hitch and trailer to the roadway.

The adjustable bumper structures 53 are preferably adjusted after the vehicle and trailer are hitched together so that the elastomeric bumper elements 64 are snugly engaged with the rear face of the vehicle bumper 14. These adjustable bumper structures 53 hence effectively act as rigidifying structures in that they cooperate with the coupling of the front connector leg 35A to the hitch bar 13 so as to effectively rigidly secure the T-shaped vehicle connector 32 relative to the vehicle 12. At the same time, however, these elastomeric bumper elements 64 have solely a compressive abutting engagement with the vehicle bumper so as to avoid any fixed securement or engagement with the bumper, whereby modifications and/or damage to the bumper is effectively avoided.

In addition, the L-shaped support arms 54 of the bumper structures can be initially adjusted so as to be disposed with the front legs 61 thereof oriented horizontally either inwardly or outwardly, or vertically either upwardly or downwardly. This hence enables the elastomeric bumper elements 64 to be positionally adjusted over a wide range both horizontally and vertically, and hence enable the bumper structure to be suitably adjusted to best accommodate the structure of the towing vehicle.

The provision of the two couplers 26 and their cooperation with the hitch balls 39 prevents the individual hitch balls from carrying out their usual universal movement. Rather, these two hitch balls will permit solely a vertical articulation between the vehicle and trailer about a substantially transverse horizontal axis which extends between the two hitch balls so as to compensate for elevational changes (that is, slope changes) in the roadway along the direction of travel. However, the use of these standard couplers and hitch balls is desired since they provide a secure coupling of the trailer to the vehicle, and at the same time provide a structure which is conventional and can be readily utilized to facilitate coupling and uncoupling of the trailer.

The hitch balls 39, and the couplers 26, are preferably sidewardly spaced apart by a sufficient distance to ensure the desired rigidity between the trailer and vehicle to provide proper tracking therebetween, but at the same time the sideward spacing between these hitch balls 39 is desirably small in relationship to the overall vehicle and trailer width so as to minimize the overall size of the hitch adapter and the overall magnitude of the displacements caused by relative roll between the trailer and vehicle.

Although a particular preferred embodiment of the invention has been disclosed in detail for illustrative purposes, it will be recognized that variations or modifications of the disclosed apparatus, including the rearrangement of parts, lie within the scope of the invention.

The embodiments of the invention in which an exclusive property or privilege is claimed are defined as follows:

1. The combination comprising:

a vehicle having a trailer hitch mounted thereon, said trailer hitch including a hitch bar which is fixed to said vehicle and projects horizontally rearwardly thereof from below the rear vehicle bumper, said hitch bar having an opening extending vertically therethrough in the vicinity of the free rearward end thereof, said opening normally permitting a conventional hitch ball to be mounted on the hitch bar;

a trailer having a pair of sidewardly-spaced caster-mounted wheels thereon for rollingly supporting same, said trailer having a tongue structure mounting thereon in sidewardly spaced relationship a pair of conventional ball-receiving couplers; and adapter means for coupling said trailer to said hitch bar for solely permitting relative vertical articulation between the trailer and the vehicle about (1) a first substantially horizontal axis which extends substantially perpendicular relative to the direction of vehicle movement and (2) a second substantially horizontal axis which extends substantially parallel relative to the direction of vehicle movement;

said adapter means including a one-piece rigid T-shaped vehicle connector which has a front portion adapted for rigid connection to said hitch bar and a rear portion which extends transversely of the vehicle in substantially parallel and rearwardly spaced relationship from the rear bumper of the vehicle, said rear portion being positioned upwardly a substantial vertical extent above said hitch bar;

said adapter means including a crossbar which is positioned adjacent but spaced rearwardly a small distance from the transversely extending rear portion of said vehicle connector, said crossbar having a pair of hitch balls mounted thereon adjacent the opposite ends thereof, said hitch balls being sidewardly spaced apart by a distance equal to the spacing between said couplers for permitting the couplers to be engaged with said hitch balls, said couplers and their engagement with the hitch balls permitting vertical articulation between the trailer and vehicle about said first horizontal axis;

said adapter means including swivel means coacting between said crossbar and said rear portion, said swivel means defining said second horizontal axis for permitting said crossbar and said trailer to undergo vertical rolling movement relative to the vehicle about said second axis, said swivel means including means for longitudinally fixedly securing said crossbar to said rear portion for permitting transmission of towing forces therethrough; and said adapter means including a pair of bumper structures mounted on said rear portion adjacent the opposite ends thereof, each said bumper structure including an elastomeric bumper element adjustably mounted for movement toward and away from the rear bumper of the vehicle, said bumper elements being adjusted forwardly for snug engagement with said rear bumper adjacent the opposite ends thereof to rigidify said rear portion relative to said vehicle bumper.

2. A combination according to claim 1, wherein said front portion of said vehicle connector comprises a substantially L-shaped plate having a horizontally projecting front leg which overlaps said hitch bar and is boltable thereto, said L-shaped plate having a rear leg which projects upwardly, and said rear portion comprising a transversely elongated bar which is fixedly and rigidly secured to said rear leg adjacent the upper end thereof, said rear leg being fixed to said transversely elongated bar substantially at the midpoint thereof, said transversely elongated bar substantially at the midpoint thereof, said bar adjacent said midpoint defining therein a sleeve bearing concentric with said second horizontal axis, and said swivel means including a stub shaft fixedly secured to said crossbar and projecting forwardly therefrom in substantially cantilevered relationship, said stub shaft being rotatably and snugly positioned in said sleeve bearing.

3. A combination according to claim 1, wherein said tongue structure includes a pair of drawbars which are fixed to and project rearwardly the trailer, said drawbars diverging with respect to one another as they project rearwardly, each said drawbar projecting rearwardly directly toward and intersecting the swivel axis of a respective said caster wheel.

4. A combination according to claim 1, wherein said adjustable bumper structure includes a substantially L-shaped member having a rear leg which projects horizontally in substantially parallel relationship with said second axis, said rear leg being adjustably but fixedly mounted on the rear portion adjacent one end thereof for permitting said L-shaped member to be adjustably moved toward or away from the rear bumper of the vehicle, said L-shaped member having a front leg which projects transversely at substantial angle relative to said rear leg, a bumper support element fixedly mounted on said front leg in radially spaced relationship from the longitudinal axis of said rear leg, and said elastomeric bumper element being mounted on the front face of said bumper support for engagement with the rear bumper of the vehicle, said L-shaped member being angularly swingable relative to said transverse rear support about the longitudinal centerline of said rear leg for selectively positioning the elastomeric bumper element for engagement with the rear bumper.

5. A trailer hitch arrangement for attachment to a hitch bar of a towing vehicle for connecting a double caster wheel trailer to the vehicle, said hitch arrangement comprising:

a vehicle connector for rigid connection to the rear of a towing vehicle, said vehicle connector being rigid and substantially T-shaped when viewed from above, said vehicle connector having a base leg which overlaps and is fixedly but releasably secured to the hitch bar, said base leg projecting rearwardly so as to project outwardly beyond the rear of a towing vehicle, said vehicle connector having a transversely extending support which, at substantially the middle thereof, is rigidly secured to the rearward end of said base leg, said support extending substantially horizontally in generally parallel relationship with the rear of a towing vehicle;

a trailer connection positioned adjacent but rearwardly of said support, said trailer connection including a crossbar which is elongated in said transverse direction so as to extend approximately parallel with said support, said crossbar having a pair of substantially identical trailer connectors mounted thereon adjacent the opposite ends thereof;

swivel means structurally connecting said crossbar and said vehicle connector together for defining a substantially horizontally-extending swivel axis which extends generally in the direction of vehicle movement for permitting relative rolling movement between the trailer and a towing vehicle, said swivel means including a swivel bearing structure and a swivel shaft rotatably received within said bearing structure, said swivel shaft being fixedly secured to one of said crossbar and vehicle connector and projecting in cantilever relationship therefrom toward the other, and said bearing structure being fixedly associated with the other of said crossbar and vehicle connector; and adjustable bumper means coacting between said support and the rear of a towing vehicle for rigidly and stationarily securing said support relative to a towing vehicle, said bumper means being adjustable in a direction toward and away from the rear of a towing vehicle and including an elastomeric bumper element for compressive abutting engagement with the rear of a towing vehicle.

6. An arrangement according to claim 5, wherein said trailer has a tow bar structure provided with two sidewardly spaced couplers adapted for engagement with the trailer connectors mounted adjacent the opposite ends of said crossbar.

7. An arrangement according to claim 6, wherein each of said trailer connectors comprises a ball, and wherein the trailer coupler includes recess-and-locking means for locking engagement with said ball.

8. The combination comprising:

a vehicle having a trailer hitch mounted thereon, said trailer hitch including a hitch bar which is fixed to said vehicle and projects horizontally rearwardly thereof from below the rear vehicle bumper, said hitch bar having an opening extending vertically therethrough in the vicinity of the free rearward end thereof, said opening normally permitting a conventional hitch ball to be mounted on the hitch bar;

a trailer having a pair of sidewardly-spaced caster-mounted wheels thereon for rollingly supporting same, said trailer having a tongue structure mounting thereon in sidewardly spaced relationship a pair of identical couplers; and adapter means for coupling said trailer to said hitch bar for solely permitting relative vertical articulation between the trailer and the vehicle about (1) a first substantially horizontal axis which extends substantially perpendicular relative to the direction of vehicle movement and (2) a second substantially horizontal axis which extends substantially parallel relative to the direction of vehicle movement;

said adapter means including a rigid vehicle connector which has a first portion rigidly connected to said hitch bar and a second portion which extends transversely of the vehicle in substantially parallel and rearwardly spaced relationship from the rear bumper of the vehicle;

said adapter means including a crossbar which is positioned adjacent but spaced rearwardly a small distance from the transversely extending second portion of said vehicle connector, said crossbar having a pair of substantially identical trailer connectors mounted thereon adjacent the opposite ends thereof, said trailer connectors being sidewardly spaced apart by a distance equal to the spacing between said couplers for permitting the couplers to be engaged with said trailer connectors, said couplers and their engagement with the trailer connectors permitting vertical articulation between the trailer and vehicle about said first horizontal axis;

said adapter means including swivel means coacting between said crossbar and said vehicle connector, said swivel means defining said second horizontal axis for permitting said crossbar and said trailer to undergo vertical rolling movement relative to the vehicle about said second axis, said swivel means including means for longitudinally fixedly securing said crossbar to said vehicle connector for permitting transmission of towing forces therethrough; and said adaptermeans including a pair of bumper structures mounted on said second portion adjacent the opposite ends thereof, each said bumper structure including an elastomeric bumper element adjustably mounted for movement toward and away from the rear bumper of the vehicle, said bumper elements being adjusted forwardly for snug engagement with said rear bumper adjacent the opposite ends therof to rigidify said second portion relative to said vehicle bumper.

9. The combination comprising:

a vehicle having a trailer hitch mounted thereon, said trailer hitch including a hitch bar which is fixed to said vehicle and projects horizontally rearwardly thereof from below the rear vehicle bumper, said hitch bar having an opening extending vertically therethrough in the vicinity of the free end thereof, said opening normally permitting a conventional hitch ball to be mounted on the hitch bar;

a trailer having a pair of sidewardly-spaced caster-mounted wheels thereon for rollingly supporting same, said trailer having a tongue structure mounting thereon in sidewardly spaced relationship a pair of conventional ball-receiving couplers; and adapter means for coupling said trailer to said hitch bar for solely permitting relative vertical articulation between the trailer and the vehicle about (1) a first substantially horizontal axis which extends substantially perpendicular relative to the direction of vehicle movement and (2) a second substantially horizontal axis which extends substantially parallel relative to the direction of vehicle movement;

said adaptermeans including a rigid vehicle connector which has a front portion which is releasably but rigidly connected to said hitch bar and a rear portion which is disposed in rearwardly spaced relationship from the rear bumper of the vehicle, said rear portion being positioned upwardly a substantial vertical extent above said hitch bar;

said adapter means including a crossbar which is positioned adjacent but spaced rearwardly a small distance from the rear portion of said vehicle connector, said crossbar extending transversely relative to the vehicle and having a pair of identical hitch balls mounted thereon adjacent the opposite ends thereof, said hitch balls being sidewardly spaced apart by a distance equal to the spacing between said couplers for permitting the couplers to be engaged with said hitch balls, said couplers and their engagement with the hitch balls permitting vertical articulation between the trailer and vehicle about said first horizontal axis;

said adapter means including swivel means coacting between said crossbar and the rear portion of said vehicle connector, said swivel means defining said second horizontal axis for permitting said crossbar and said trailer to undergo vertical rolling movement relative to said vehicle about said second horizontal axis, said swivel means including means for longitudinally fixedly securing said crossbar to said vehicle connector for permitting transmission of towing forces therethrough; and said adapter means having means associated therewith and cooperating with said vehicle for maintaining said adapter means in a stationary and rigidified relationship relative to said vehicle.

10. A combination according to claim 9, wherein said front portion of said vehicle connector comprises a substantially L-shaped plate having a horizontally projecting front leg which overlaps said hitch bar and is bolted thereto, said L-shaped plate having a rear leg which projects upwardly, and said rear portion comprising a transversely extending bar which is fixedly and rigidly secured to said rear leg adjacent the upper end thereof, said transversely extending bar defining therein a sleeve bearing concentric with said second horizontal axis, and said swivel means including a stub shaft fixedly secured to said crossbar and projecting forwardly therefrom in substantially cantilevered relationship, said stub shaft being rotatably and snugly positioned in said sleeve bearing.

11. A combination according to claim 9, wherein said last-mentioned means includes a pair of elements which are mounted on the vehicle connector in sidewardly spaced relationship for creating a stationary and rigidifying relationship with the vehicle when the vehicle connector is mounted on the hitch bar.

* * * * *